United States Patent
Ganz

(10) Patent No.: US 12,128,988 B2
(45) Date of Patent: Oct. 29, 2024

(54) CADENCE BASED SHOE-PEDAL COUPLING SYSTEM

(71) Applicant: Bradley M. Ganz, Portland, OR (US)

(72) Inventor: Bradley M. Ganz, Portland, OR (US)

( * ) Notice: Subject to any disclaimer, the term of this patent is extended or adjusted under 35 U.S.C. 154(b) by 331 days.

(21) Appl. No.: 17/470,502

(22) Filed: Sep. 9, 2021

(65) Prior Publication Data

US 2022/0081062 A1    Mar. 17, 2022

Related U.S. Application Data

(60) Provisional application No. 63/077,114, filed on Sep. 11, 2020.

(51) Int. Cl.
| | |
|---|---|
| *B62M 3/08* | (2006.01) |
| *A43B 1/00* | (2006.01) |
| *A43B 5/14* | (2006.01) |
| *B62J 45/20* | (2020.01) |
| *B62J 45/412* | (2020.01) |
| *B62J 45/413* | (2020.01) |
| *B62J 45/415* | (2020.01) |
| *H01F 7/06* | (2006.01) |

(52) U.S. Cl.
CPC ............. *B62M 3/086* (2013.01); *B62J 45/20* (2020.02); *B62J 45/412* (2020.02); *B62J 45/413* (2020.02); *B62J 45/415* (2020.02); *H01F 7/064* (2013.01); *A43B 1/0054* (2013.01); *A43B 5/14* (2013.01)

(58) Field of Classification Search
CPC . B62M 3/08; B62M 3/086; B62J 45/20; B62J 45/412; B62J 45/413; B62J 45/415; H01F 7/064; H01F 7/20; A43B 1/0054; A43B 5/14; A43B 13/10
See application file for complete search history.

(56) References Cited

U.S. PATENT DOCUMENTS

| | | | | |
|---|---|---|---|---|
| 6,597,166 B2 * | 7/2003 | Meggiolan | ............ | H01M 10/48 324/174 |
| 7,571,544 B2 * | 8/2009 | Champoux | ............ | B62M 3/086 33/1 N |
| 9,038,502 B2 * | 5/2015 | Zoumaras | ................ | B62J 25/04 74/594.6 |
| 9,840,305 B1 * | 12/2017 | Tsuchizawa | ............. | B62M 6/80 |

(Continued)

FOREIGN PATENT DOCUMENTS

| | | | | |
|---|---|---|---|---|
| CN | 1762760 A | * | 4/2006 | ........... A43B 1/0054 |
| CN | 201907622 U | * | 7/2011 | |

(Continued)

OTHER PUBLICATIONS

Magnetic Saftey Bike Pedals; Magped; https://www.magped.us/ (last visited Mar. 13, 2024).

*Primary Examiner* — Adam D Rogers
(74) *Attorney, Agent, or Firm* — Ganz Law, PC

(57) ABSTRACT

A system for selectively coupling a shoe to a pedal electromagnetically or electromechanically, the system including: an electromagnet for coupling a pedal and shoe and/or an electromechanical retention element for coupling to a pedal to a shoe, the electromagnet and/or the electromechanical retention element being activatable based on a signal from a cadence sensor indicating a predetermined cadence condition for a pedal associated with the cadence sensor.

19 Claims, 7 Drawing Sheets

(56) References Cited

U.S. PATENT DOCUMENTS

2011/0302811 A1* 12/2011 Chang .................... B62M 3/086
                                                                        36/131
2017/0106940 A1    4/2017   Paick
2017/0120982 A1    5/2017   Williams

FOREIGN PATENT DOCUMENTS

| CN | 104554593 | | 4/2015 | |
|----|-----------|---|--------|---|
| CN | 115303399 A | * | 11/2022 | |
| FR | 2794715 A1 | * | 12/2000 | ............. B62M 3/08 |
| KR | 20170045868 | | 4/2017 | |

\* cited by examiner

CADENCE BASED SHOE-PEDAL COUPLING SYSTEM

RELATED APPLICATION

This application claims the benefit and priority to U.S. Provisional Application No. 63/077,114, filed on Sep. 11, 2020, which is hereby incorporated by reference in its entirety for all purposes.

BACKGROUND

Embodiments of the inventive subject matter relate to a bicycle and a control method of the same, and more particularly, to a bicycle including a pedal which is selectively coupled to a rider's shoe for effective pedaling and to a method of controlling the engagement of the shoe to the pedal. The inventive subject is particularly directed to a system for selectively, magnetically coupling the shoes to the pedals based on pedal rpm (which is also known as "cadence").

In general, with pedals that do not couple to a rider's shoes, the rider's shoes slip easily or lift off during pedaling or when encountering rough terrain, such as is in mountain biking. The decoupling of the shoes from the pedals impedes the rider from higher pedal efficiencies that can be achieved through coupled upstrokes. The decoupling also means that the rider's feet can slip of the pedals a create a risk of fall or injurious contact with the bike frame in rough terrain. Unfortunately, having the feet coupled at all times, while avoiding the foregoing problems may create new risks. At low speeds, the rider may not have time or agility to decouple cleats and therefore may topple over. Mountain bikers on rough trails are especially at risk.

US Pat Publication 20170106940 is directed to an electromagnetic cleat coupling system that adjusts the magnetic attraction of a cleat to a pedal, with the attraction being stronger at high speeds and being low or zero below a low, threshold speed. However, speed may not correlate to the need for decoupling. For example, a mountain biker may use an easy gear that produces very low speeds on steep up hills or low rough terrain. In such cases, the rider would want a secure coupling of the shoes to the pedals. In such cases, the rider may be moving slowly but at a sufficiently high cadence due to the easiness of the selected gear, which corresponds to a stable riding condition.

Other background prior art includes the following patent documents: US20170120982; KR20170045868; CN104554593. A commercial magnetic pedal is also known, i.e., the MagPed pedal (www.magped.us).

Unfortunately, the prior art does not provide a solution that distinguishes low-speed higher risk conditions from from low-speed, low-risk situations where a speed is still relatively low, but a cadence is relatively high and indicative of a stable riding condition. In other situations, cadence monitoring provides a useful way to assess if shoes and pedals should be decoupled for other reasons. For example, stationary bikes and trainers have no speed, so monitoring speed is useless in such applications. Cadence monitoring allows coupling and decoupling when needed to mount or dismount the pedaled, stationary apparatus.

SUMMARY

The inventive subject matter overcomes the foregoing and other disadvantages in the prior art.

In certain embodiments, the inventive subject matter is directed to a system for selectively coupling a shoe to a pedal electromagnetically or electromechanically, the system including: an electromagnet for coupling a pedal and shoe and/or an electromechanical retention element for coupling to a pedal to a shoe, the electromagnet and/or the electromechanical retention element being activatable based on a signal from a cadence sensor indicating a predetermined cadence condition for a pedal associated with the cadence sensor.

In accordance with one possible embodiment of the inventive subject matter, a bicycle or other pedal-powered vehicle includes: an electromagnet installed in a pedal body or other pedal portion and configured to generate a magnetic force when power is supplied thereto; a switching unit configured to vary the power supplied to the electromagnet; and an electronic control unit configured to turn on or off the switching unit or otherwise control its power output.

The bicycle or other pedal-powered vehicle, or system for use on a bicycle, may further include a cadence sensor which senses a pedal cadence, wherein the electronic control unit may control operation of the switching unit according to the sensed pedal cadence and wherein the system also factors in a sensed speed or acceleration or deceleration of the bicycle.

When the sensed cadence of the pedals is decreased to a predetermined cadence while the bicycle is traveling, the electronic control unit may turn on or off the switching unit or vary power supplied to the electromagnet or electromechanical retention element.

The bicycle or other pedal-powered vehicle, or system for use on a bicycle may further include an input unit configured to receive a command from a rider, wherein the electronic control unit may control operation of the switching unit according to the command input through the input unit.

The bicycle or other pedal-powered vehicle, or system for use on such a vehicle, may further include a cadence sensor configured to sense a cadence of the bicycle, wherein the electromagnetic including a plurality of electromagnets may be provided on a pedal body or other pedal portion, and the electronic control unit may control operation of the switching unit so that the number of the electromagnet to which power is supplied among the plurality of electromagnets is increased or decreased to selectively control the overall magnetic force between a pedal and shoe.

In accordance with another aspect of the inventive subject matter, a bicycle or other pedal-powered vehicle, or system for use on a such a vehicle, includes: an electromagnet installed in a pedal body rotatably coupled to a pedal shaft and configured to generate a magnetic force when power is supplied thereto; and an operation button configured to be turned on or off by a rider, wherein, when the operation button is turned on, power may be supplied to the electromagnet, and when the operation button is turned off, the power supplied to the electromagnet may be cut off.

In accordance with still another aspect of the inventive subject matter, a control method of a bicycle, or other pedal-powered vehicle, including a pedal in which an electromagnet which is supplied with power and generates a magnetic force is installed, includes: supplying power to an electromagnet while a bicycle or other pedal-powered vehicle is traveling; sensing a pedal cadence; and cutting off or reducing the power supplied to the electromagnet when the sensed cadence of the bicycle is decreased to a predetermined speed.

In accordance with yet another aspect of the inventive subject matter, a control method of a bicycle, or other pedal-powered vehicle, including a pedal in which an electromagnet which is supplied with power and generates a magnetic force is installed, includes: supplying power to an electromagnet while a bicycle or other pedal-powered vehicle is traveling; sensing a pedal cadence and a speed or acceleration of the bicycle or other pedal-powered vehicle; and when a change of the sensed speed or acceleration is greater than a predetermined value maintaining pedal-shoe coupling even though the cadence is low (predetermined threshold) or zero.

These and other embodiments are described in more detail in the following detailed descriptions and the figures.

The following is a description of various inventive lines under the inventive subject matter. The appended claims, as originally filed in this document, or as subsequently amended, are hereby incorporated into this Summary section as if written directly in.

The foregoing is not intended to be an exhaustive list of embodiments and features of the inventive subject matter. Persons skilled in the art are capable of appreciating other embodiments and features from the following detailed description in conjunction with the drawings.

BRIEF DESCRIPTION OF THE DRAWINGS

The appended figures show embodiments according to the inventive subject matter, unless noted as showing prior art. These and/or other aspects of the invention will become apparent and more readily appreciated from the following description of the embodiments, taken in conjunction with the accompanying drawings of which.

DETAILED DESCRIPTION

Figure 1:
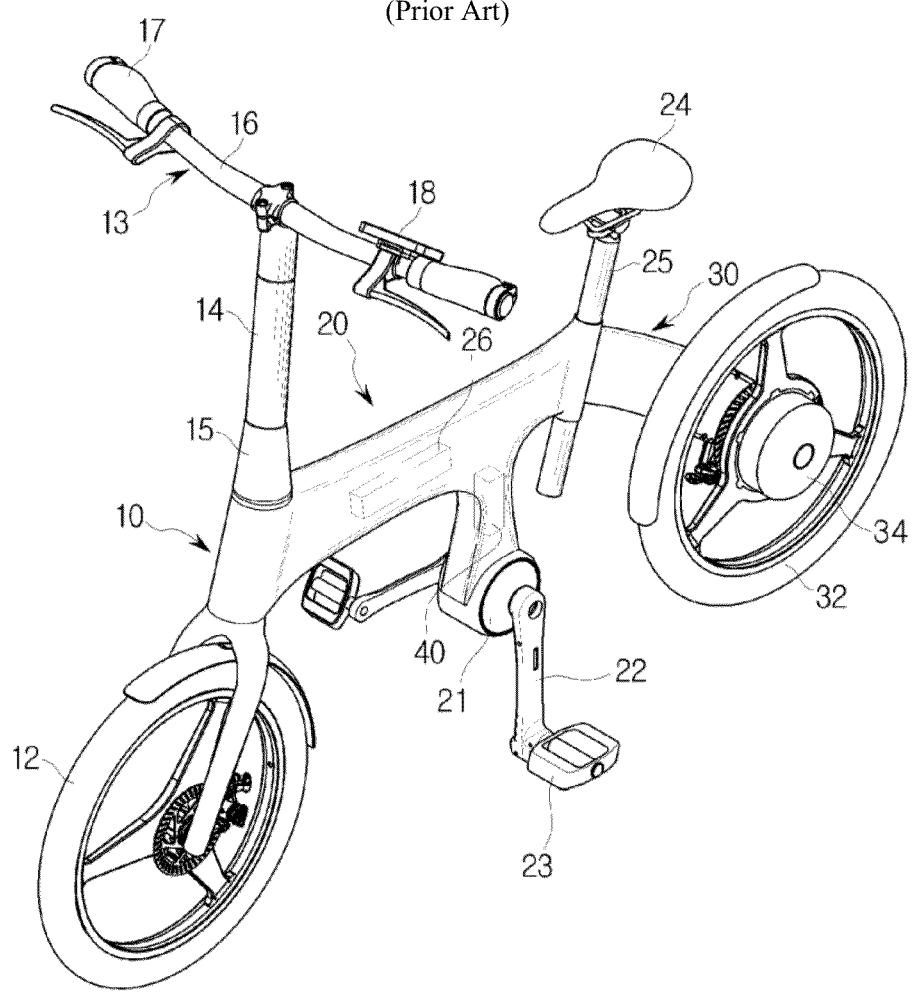
FIG. 1 is a configuration diagram illustrating an electric bicycle according to one possible embodiment.

Representative embodiments according to the inventive subject matter are shown in FIGS. 1-8. As used herein, "bicycle" means any traditional two-wheeled bicycle, and for convenience, any other pedaled vehicles, and stationary pedaled apparatus like ergometers and trainers. An electric bicycle is any such pedalable object that has an electric motor and power supply (e.g., a battery) for propelling the bicycle in an assistive manner or in a separate electronic-only mode of operation.

Hereinafter, embodiments of the inventive subject matter will be described in detail with reference to following drawings. The following drawings are examples to provide the scope of the inventive subject matter to those skilled in the art. The inventive subject matter is not limited to the following embodiments and may be implemented in different forms. Parts irrelevant to description are omitted in the drawings in order to clearly describe the inventive subject matter, and widths, lengths, thicknesses of components in the drawings may be exaggerated for convenience of description. In this specification, like reference characters denote like components.

In the embodiments, an electric bicycle is described as an example, however, they are not limited thereto, the embodiments of the inventive subject matter may be applied to a non-electric bicycle by providing the bike with a power supply (e.g., a battery) for powering the electromagnets or electromechanical elements.

FIG. 1 is a block diagram illustrating an electric bicycle according to one embodiment of the inventive subject matter.

Referring to FIG. 1, an electric bicycle may include a front frame 10, a middle frame 20, and a rear frame 30.

The front frame 10 may include a front wheel 12, and a handle stay 14 connected to a handle 13.

The handle 13 may include a handle stem 15 coupled to a lower end of the handle stay 14, a handlebar 16 coupled to the handle stay 14, and a handle grip 17 installed on the handlebar 16.

The front wheel 12 is rotatably coupled to one side of a lower end of the handle stay 14. The handle stem 15 is provided for adjusting a height of the handle 13. The handlebar 16 is provided for determining the steering of the bicycle. An interface 18 which displays a state of the electric bicycle to a user and transfers a requirement of the user to an electronic control unit 40 using a button or a display is provided on the handle grip 17. Such an interface 18 is electrically connected to the electronic control unit 40 through wired or wireless communication.

A power generator 21 is provided at one end of the middle frame 20, pedals 23 are installed at both sides of the power generator 21 to be rotatable by crank arms 22. One end of each of the crank arms 22 is rotatably coupled to a pedal shaft of the middle frame 20, and the pedal 23 is rotatably coupled to the other end thereof. When a rider rotates the pedal 23, a rotational force of the pedal 23 is converted into electrical energy by the power generator 21, and the electrical energy of the power generator 21 may be accumulated in a battery 26 provided in the middle frame 20.

The middle frame 20 may further include a saddle tube 25 for installing a saddle 24.

A rear wheel 32 is rotatably installed at one side of an end of the rear frame 30. A motor 34 for rotating the rear wheel 32 and advancing the electric bicycle is installed at the center of the rear wheel 32. The motor 34 may include a transmission so that a rider changes a rotational speed of the rear wheel 32 using the interface 18 or a throttle.

Figure 2:
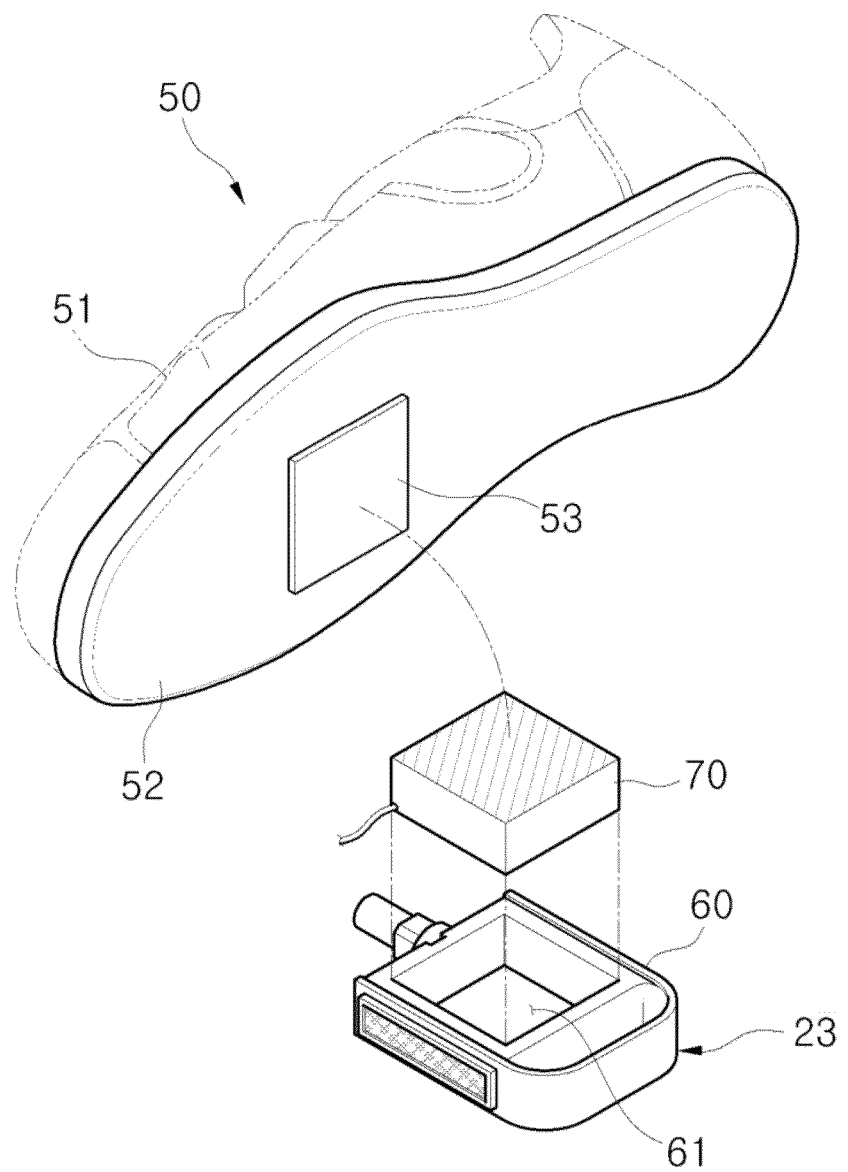
FIG. 2 is a configuration diagram illustrating a cleat and pedal of the electric bicycle according to one possible embodiment.
Figure 3:
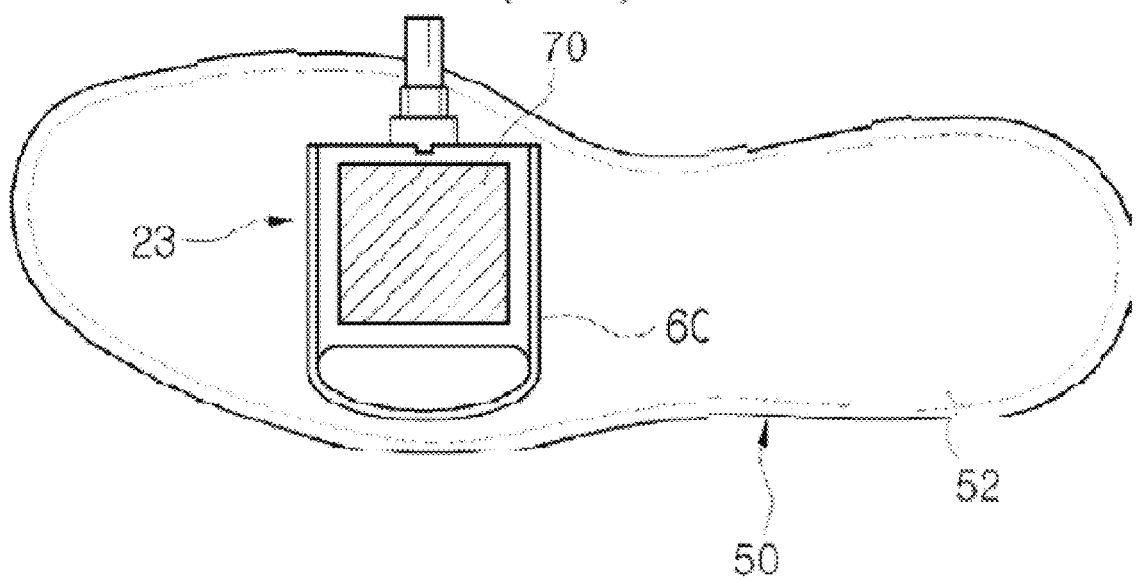
FIG. 3 is a view for describing a shoe coupled to the pedal of the electric bicycle according to one possible embodiment.

FIG. 2 is a configuration diagram illustrating a pedal of the electric bicycle according to one embodiment of the inventive subject matter, and FIG. 3 is a view for describing a shoe coupled to the pedal of the electric bicycle according to one embodiment of the inventive subject matter.

Referring to FIGS. 2 and 3, a shoe 50 may include an upper shoe part 51 and a shoe sole 52.

On the shoe sole 52, at least one magnetic body 53 (e.g., a ferromagnetic material) is provided at a position corresponding to the pedal 23 of the electric bicycle. (As indicated below, in an alternative embodiment, an electromechanical retention element for engaging a complementary shoe element, e.g., a cleat, may be substituted for the retentive electromagnet.)

The magnetic body 53 is integrally formed on or in the shoe sole 52 or detachably provided on the shoe sole 52.

The pedal 23 may include a pedal body 60 coupled to the crank arm 22, and an electromagnet 70 disposed in the pedal body 60.

The electromagnet 70 is a magnet by which a magnetic field is created while current flows. When current does not flow, the magnetic field disappears. The simplest electromagnet 70 includes a solenoid made by winding a coil around an iron core having a cylindrical shape. When current flows in coils wound in a cylindrical shape, a magnetic field is created, and when an iron core is inserted thereinto, a stronger magnetic field is created.

The electromagnet 70 may be provided at the central portion of the pedal body 60. In some cases, the electromagnet 70 may be provided at a position which is not the central portion of the pedal body 60. When necessary, the electromagnet 70 may also be provided at a plurality of positions on the pedal body 60 in a plural number.

A through hole 61 may be formed at the central portion of the pedal body 60. The pedal body 60 may be inserted into a crank arm 22. The electromagnet 70 may be installed by being inserted into the through hole 61 of the pedal body 60.

In a state in which power is supplied to the electromagnet 70 of the pedal 23 having the above-described structure, magnetic body 53 is provided on or in the bottom surface portion of the shoe, e.g., shoe sole 52. When the rider wearing shoe 50 steps on the pedal 23, since the electromagnet 70 is provided in the pedal 23, the magnetic body 53 is magnetically attracted to the electromagnet 70, and the shoe 50 is fixed to the pedal 23.

While a rider is riding the electric bicycle, since the shoe 50 is constantly fixed to the pedal 23 by a magnetic force of the electromagnet, the shoe 50 may be prevented from slipping from the pedal 23. When the rider releases the shoe from the pedal 23, the magnetic force between the electromagnet 70 and the magnetic body 53 is removed by stopping the supplying of the power to the electromagnet 70 and the coupling is released. Accordingly, the shoe 50 and the pedal 23 may be more easily coupled to each other or released from the coupling using the electromagnet 70.

Figure 4:
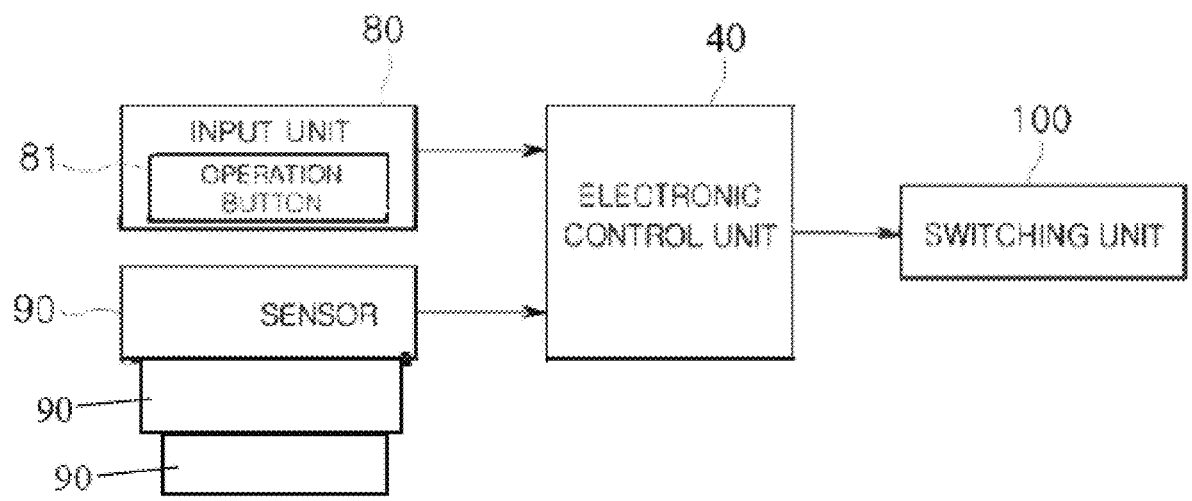
FIG. 4 is a control block diagram of the electric bicycle according to one possible embodiment.

FIG. 4 is a control block diagram of the electric bicycle according to one embodiment of the inventive subject matter. The electric bicycle includes the electronic control unit 40 which performs overall control of the electric bicycle.

An input unit 80 and a cadence sensor 90 are electrically connected to an input side of the electronic control unit 40. A switching unit 100 is electrically connected to an output side of the electronic control unit 40. The input unit 80 receives a command of a rider. The input unit 80 receives a command for coupling the shoe to the pedal or releasing from the coupling using the electromagnet. To this end, the input unit 80 includes an operation button 81 which is manipulable by a rider. Even though it will be described below, when a rider turns on the operation button 81, the electronic control unit 40 turns on the switching unit 100 to operate the electromagnet 70. When the operation button 81 is turned off, the electronic control unit 40 turns off the switching unit 100 to stop the operation of the electromagnet 70. For reference, the input unit 80 may include the interface 18.

The bicycle includes sensor system 90 which consists of one or more sensors at least one of which senses a pedal cadence of the electric bicycle. The sensor system 90 may include a wheel speed sensor which senses a rotational speed of the front wheel and/or the rear wheel. The readings from the wheel sensor may be translated to a bicycle velocity. Sensor system 90 may also include a GPS sensor for measuring the speed and/or position of the bicycle. It may also include positional or tilt sensors.

The sensor system 90 may include a speed or G-force sensor which measures the acceleration or deceleration of a bicycle or a Hall sensor which detects a rotational speed of the motor 34 which rotates the rear wheel 32 rather than the wheel cadence sensor. The sensor system 90 transfers information of the sensed speed to the electronic control unit 40.

The switching unit 100 is turned on or off according to a control signal of the electronic control unit 40. The switching unit 100 is provided between a power unit and the electromagnet 70 and switches on or off the power supplied from the power unit to the electromagnet 70. For example, when the switching unit 100 is turned on, power is supplied to the electromagnet 70, and the shoe 50 and the pedal 23 are coupled to each other. When the switching unit 100 is turned off, the supply of power to the electromagnet 70 is cut off, and the shoe 50 and the pedal 23 are released from the coupling.

Figure 5:
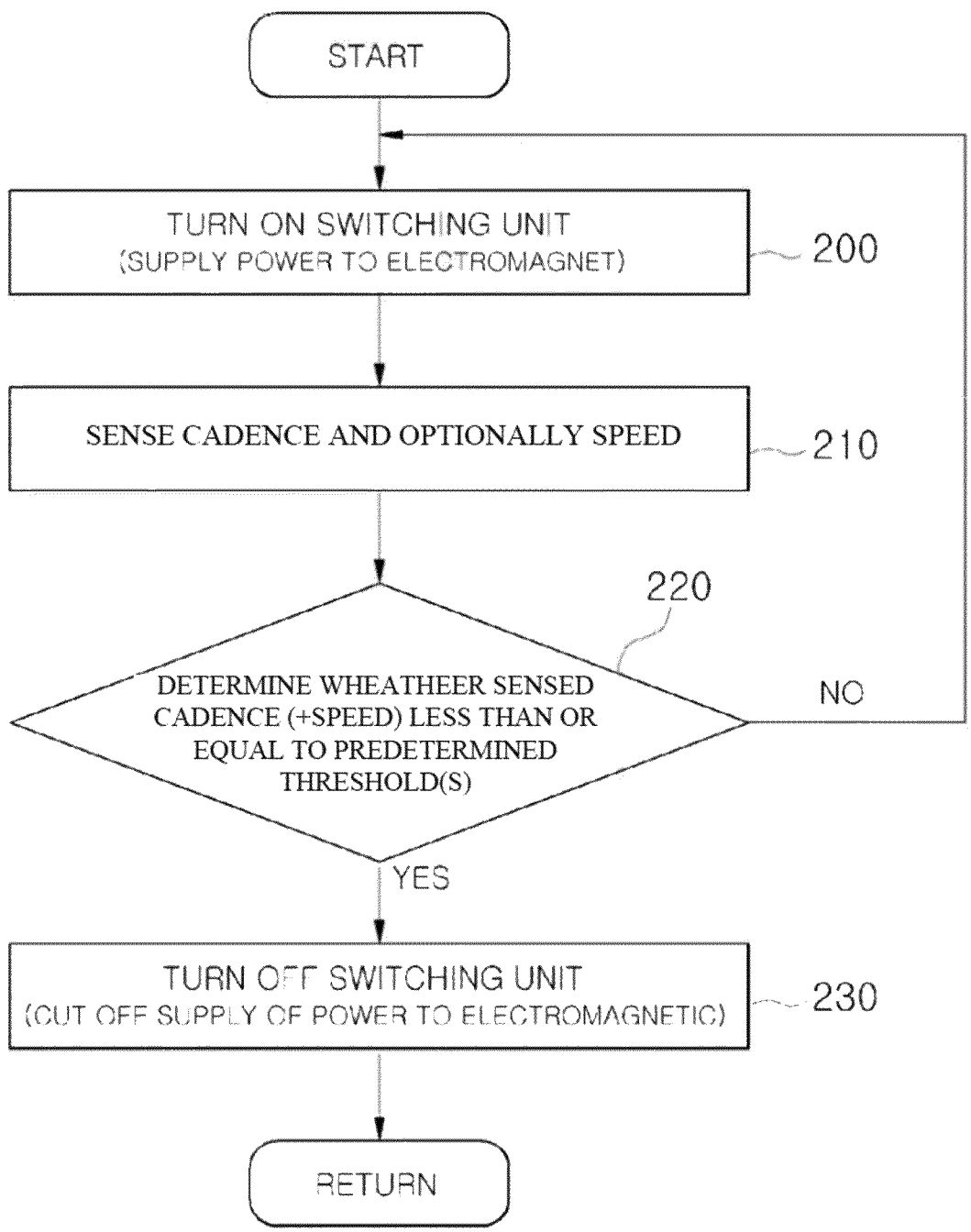
FIG. 5 is a control flow chart of a control method of the electric bicycle according to one possible embodiment.

Hereinafter, a specific operation of the electronic control unit 40 will be described. FIG. 5 is a control flow chart of a control method of the electric bicycle according to one embodiment of the inventive subject matter. First, the electronic control unit 40 turns on the switching unit 100 (200). The electronic control unit 40 turns on the switching unit 100 based on a rider's command input through the input unit 80 or a speed of the electric bicycle. When a rider turns on the operation button 81 provided at the input unit 80, the electronic control unit 40 may receive an operation signal according to the turning on of the operation button and may turn on the switching unit 100 according to the received operation signal. In addition, when the rider rides the bicycle and the pedaling begins and reaches a threshold cadence, e.g., 20 RPM, the electronic control unit 40 may turn on the switching unit 100.

When the switching unit 100 is turned on, the electromagnet 70 is supplied with power and becomes a magnet. Accordingly, when a rider steps on the pedal 23 wearing the shoe, the magnetic body 53 of the bottom of a shoe is attracted to the electromagnet 70 of the pedal 23, and the shoe 50 is coupled to the pedal 23. The attractive force can be binary on or off according to a threshold value or can be scaled depending on speed. For example, it can be off at a 20 RPM or less. Or, it can be at 10% strength at 20 RPM, 20% at 30 RPM, 30% at 40 RPM, 40% at 50 RPM, 50% at 60 RPM, 60% at 70 RPM, etc. It could have an upper threshold value where it converts from a value less than 100% to full level. For example, at 50 RPM the force could be 70%. Above 50 RPM, the attractive force could switch to 100% attractive force. The inventive subject matter contemplates that in some embodiments there could be a battery conservation mode where if battery level drops below a certain amount, attractive forces at all rpms are decreased a predetermined about, e.g., by 5%, 10%, 20%, or 30%, 40%, or 50%.

The electronic control unit 40 continues to sense and monitor a cadence while the pedals are spinning using the cadence sensor 90 (210). The electronic control unit 40 compares the sensed cadence and determines whether the sensed cadence is less than or equal to the predetermined cadence or not (220). At this time, the predetermined cadence may include a cadence indicative of just before the bicycle stops or a cadence when the bicycle enters a cadence range in which the rider is difficult to balance (for example, less than or equal to 3.5 miles per hour). The cadence indicators may also be coupled with a speed indicator from a speed sensor to help better indicate a state of riding. For example, a low cadence may not indicate that a rider is slowing or about to stop such that there is a need to reduce magnetic attraction. The rider may be free-wheeling while still moving at good speed or accelerating. Secure shoe-pedal coupling may be desired under such conditions. A speed indicator showing slow speed coupled with slow cadence can establish the need to reduce magnetic attraction.

When a determined result of the operation mode 220 is that the sensed bicycle cadence is greater than the predetermined speed, the electronic control unit 40 moves to the operation mode 200 and performs a subsequent operation mode.

Meanwhile, when the determination result of the operation mode 220 is that the sensed bicycle cadence is less than or equal to the predetermined cadence, the electronic control unit 40 turns off the switching unit 100 (230). Again, this process can be coupled with a speed sensor reading that indicates if the rider is above or below a threshold speed. For example, if the rider is moving more than 1, 2, 5, 10, 15 or 20 mile per hour, the electromagnetic engagement could be maintained even if cadence drops to a below a low threshold number.

When the switching unit 100 is turned off, the supply of power to electromagnet 70 is cut off or reduced, and a magnetic force disappears or decreases. Accordingly, when the rider steps on the pedal 23 with the shoe 50, the magnetic body 53 of the bottom of a shoe is not fixed to the electromagnet 70 of the pedal 23, and is free to move, and the shoe 50 is released from the coupling with the pedal 23. Accordingly, the coupling of the shoe 50 and the pedal 23 and releasing from the coupling may further conveniently and safely be performed.

However, in the previous embodiment, it is described that the switching unit 100 of the bicycle is turned off, it is not limited thereto, and when a decrease in cadence and/or a deceleration change of the bicycle during traveling is greater than the predetermined value, the switching unit 100 may be turned off or restrict power to the electromagnet(s).

Figure 6:
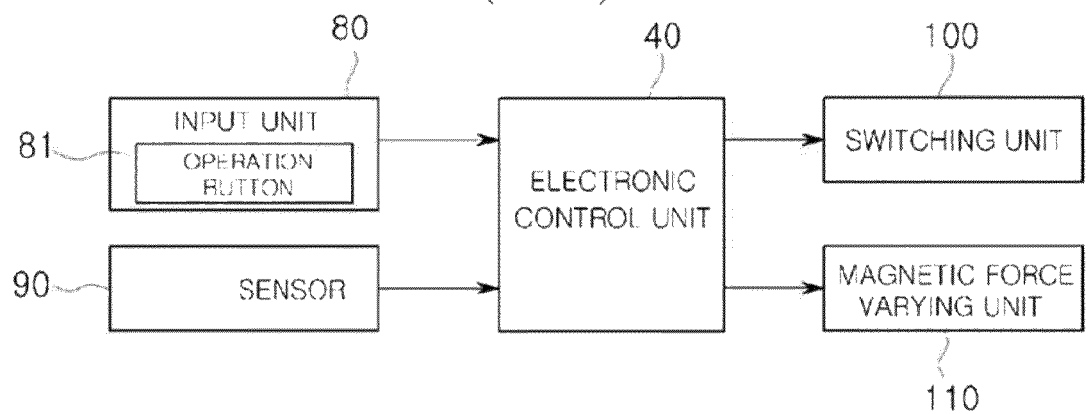
FIG. 6 is a control block diagram of an electric bicycle according to another possible embodiment

FIG. 6 is a control block diagram of an electric bicycle according to another embodiment of the inventive subject matter. An electric or conventional bicycle may include a magnetic force varying unit 110. The magnetic force varying unit 110 varies a magnetic force of an electromagnet 70. The magnetic force varying unit 110 may include a variable resistor and may vary the strength of the magnetic force of the electromagnet 70 by varying a current or a voltage supplied to the electromagnet 70 using the variable resistor.

The magnetic force varying unit 110 may be integrally formed with a switching unit 100. In this case, the switching unit 100 may include a component capable of controlling a pulse width modulation. As an electronic control unit 40 controls switching by adjusting a duty signal of the switching unit 100, the electronic control unit 40 may adjust a current or a voltage supplied to the electromagnet 70. Accordingly, the strength of the magnetic force of the electromagnet 70 may be varied.

When the pedal cadence drops and/or a bicycle is decelerated while traveling, the electronic control unit 40 may vary the strength of the magnetic force of the electromagnet 70 according to a cadence reduction or a deceleration degree of the bicycle. For example, when the pedal cadence is slightly reduced and/or a bicycle speed is slightly decelerated, the magnetic force of the electromagnet 70 is set at a first strength, and when the pedal cadence is reduced and/or the bicycle is further decelerated, the magnetic force of the electromagnet 70 is set as a second strength less than the first strength. Accordingly, the coupling or releasing of a shoe 50 and a pedal 23 may gradationally be performed according to a cadence reduction and/or a deceleration of the bicycle.

It is noted that cadence as used herein refers to a forward pedaling motion. On a free-wheel bike, a reverse pedaling motion may be considered to be zero cadence.

Figure 7:
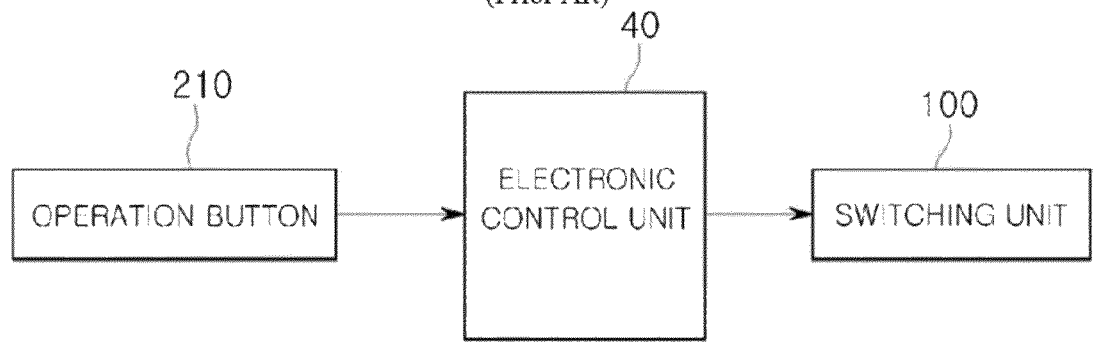
FIG. 7 is a control block diagram of an electric bicycle according to still another possible embodiment.

FIG. 7 is a control block diagram of an electric bicycle according to still another embodiment of the inventive subject matter. An electric bicycle includes an operation button 210 which is manipulable by a rider, an electronic control unit 40, and a switching unit 100. The electric bicycle including the above-described structure turns on or off the switching unit 100 by a rider turning on or off the operation button 210 provided at a handle regardless of a pedal cadence or bicycle speed.

When the operation button 210 is turned on, the switching unit 100 is turned on to operate an electromagnet, and a shoe 50 and a pedal 23 are coupled to each other. When the operation button 210 is turned off, the switching unit 100 is turned off to release the operation of the electromagnet to release the coupling between the shoe 50 and the pedal 23.

For reference, the power supplied to an electromagnet 70 may also be directly switched on or off by removing the electronic control unit 40 and the switching unit 100, forming the operation button 210 into a switch form, disposing the operation button 210 at a circuit which supplies power to the electromagnet, and turning on or off the operation button 210.

Even though, in the above-described embodiment of the inventive subject matter, one electromagnet 70 is provided at a central portion of a pedal body 60 of the pedal 23, it is not limited thereto, a plurality of electromagnets 70 may also be provided.

Figure 8:
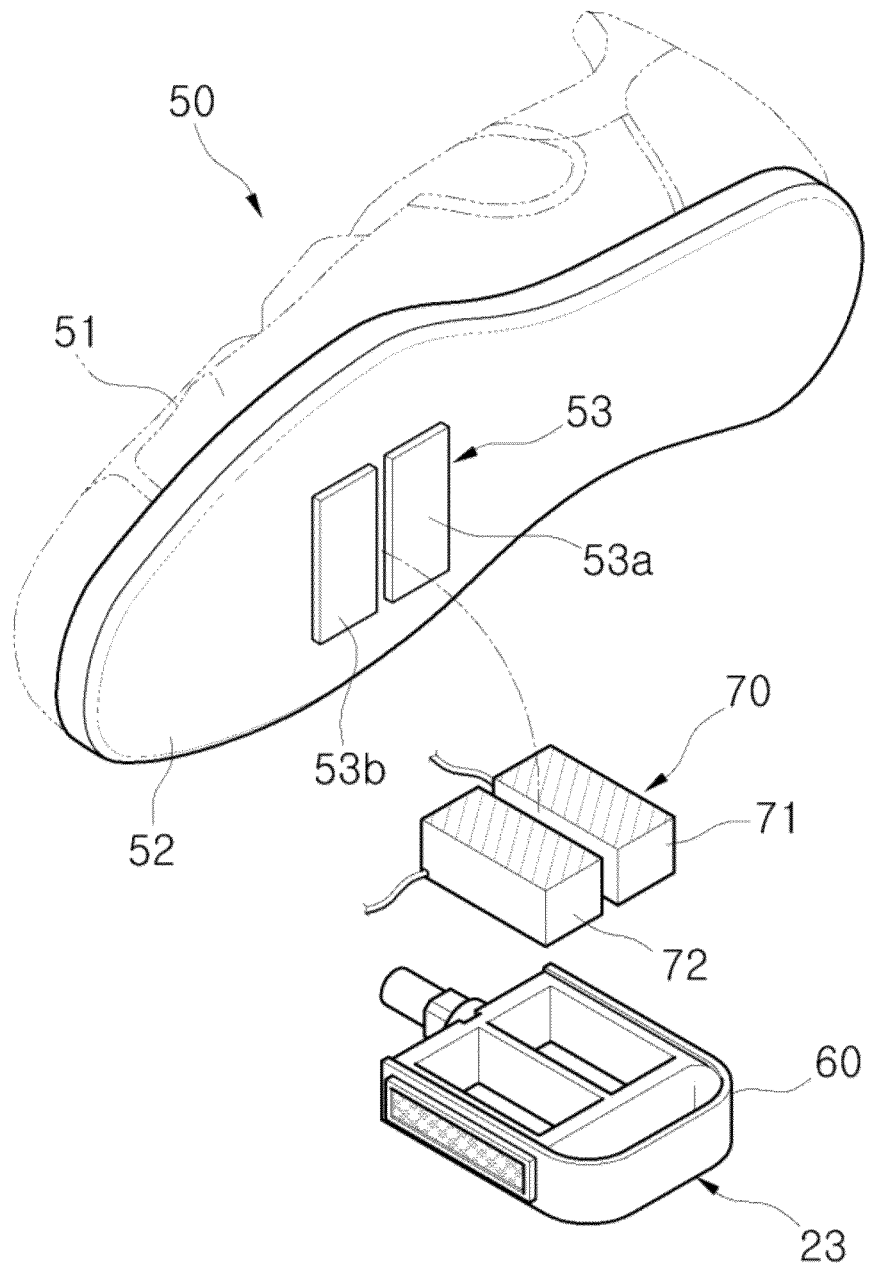
FIG. 8 is a configuration diagram illustrating a pedal of the electric bicycle according to yet another possible embodiment.

FIG. 8 is a configuration diagram illustrating a pedal of the electric bicycle according to yet another embodiment of the inventive subject matter. An electromagnet 70 is disposed in a plural number to include a first electromagnet 71 and a second electromagnet 72. In this case, a first magnetic body 53*a* corresponding to the first electromagnet 71, and a second magnetic body 53*b* corresponding to the second electromagnet 72 are disposed on the shoe sole 52. When the plurality of electromagnets are provided, an electronic control unit 40 may selectively operate any electromagnets out of the plurality of electromagnets according to a command input through an input unit 80. To this end, the strength of an entire magnetic force of the electromagnets may be varied.

As described above, a varying of the number of electromagnets configured to operate may be performed using a change of pedal cadence and/or a speed or a deceleration of a bicycle.

As is apparent from the above description, since a rider's shoe is coupled to a pedal or released from the coupling using an electromagnet, the shoe can be further conveniently and safely coupled to the pedal and released from the coupling.

In addition, when a rider's shoe is coupled to a pedal or released from the coupling, since an electromagnet operates or stops the operation according to an operation of a rider, the rider can conveniently couple the shoe to the pedal or release the coupling.

In addition, when a rider's shoe is coupled to a pedal or released from the coupling, since an electromagnet operates or stops the operation according to a cadence and optionally a speed of a bicycle, the rider can conveniently couple the shoe to the pedal or release the coupling.

In other embodiments, coupling and decoupling of the shoes and pedals may be through at least partial mechanical engagement. For example, the pedal and shoes could include standard clipless pedal features in combination with an electromagnetic system. In another example, the shoes could include just a front or rear cleat that is complementary with a receptacle on the front or rear of the pedal body. The complementary elements engage to hold the shoe and pedal together at a front or rear side.

In some embodiments, the electromagnet could be on the rider's shoes instead of or in addition to the pedals, with a power supply on the rider, or on the bike and coupled to the rider, coupling to the shoes.

In some embodiments, a positional or tilt sensor can indicate that the rider is unstable or falling over. The signal from the sensor can be used to trigger deactivation of the electromagnets or other electronically controlled shoe-pedal retention system.

Figure 9:
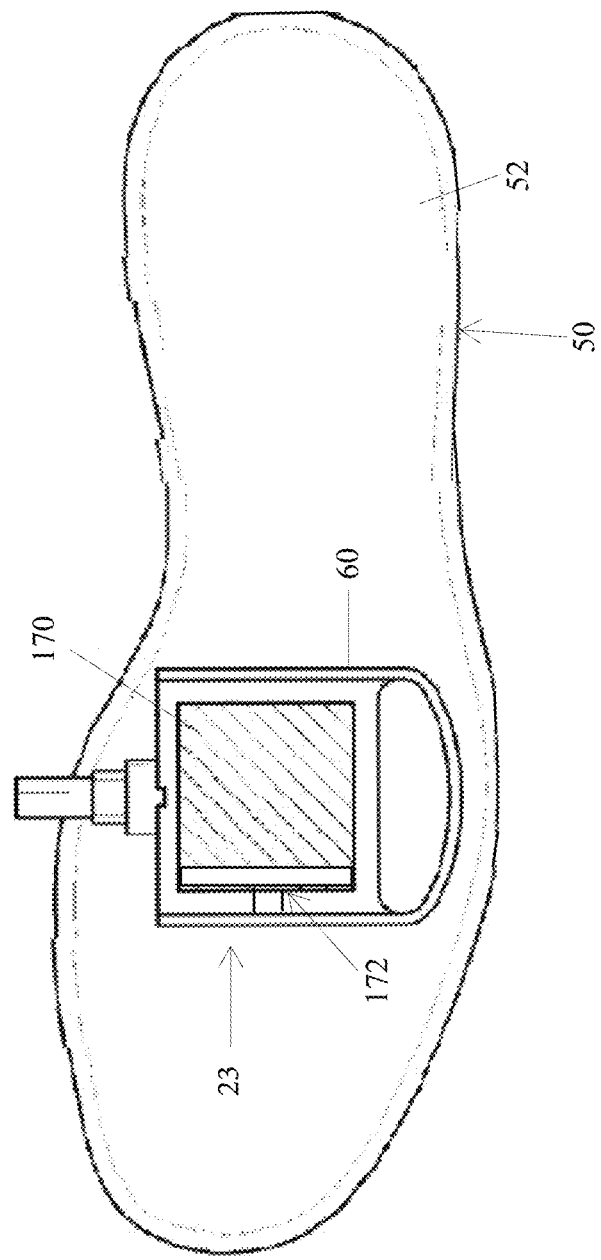
FIG. 9. Is a view for describing a shoe coupled to the pedal of a bike according to an alternative embodiment have an electromechanical retention element which is conceptually shown.

For example, FIG. 9 shows a pedal body 60 that receives a shoe cleat 170. The figure shows an alternative embodiment having an electromechanical retention element, in the form of a spring activator assembly 172, which is conceptually shown. Spring activator assembly 172 can engage or disengage against cleat 170 as described above.

In other embodiments, the coupling of shoes and pedals is not based on magnetic attraction between the pedals and the shoes. Rather, the shoe and/or the pedal have an electrical switch system that activates a mechanical coupling of the pedals and the shoes. The coupling follows the same principles as for the electromagnetic coupling, with the mechanical components engaging and disengaging under predetermined pedal cadence conditions. The coupling strength can also be variable according to conditions, e.g., a mechanical spring may be adjusted through the electronic system so that spring tension may be varied and coupling force also varied accordingly.

In some embodiments, a positional or tilt sensor can indicate that the rider is unstable or falling over. The signal from the sensor can be used to trigger deactivation of the electromagnets or other electronically controlled shoe-pedal retention system.

Although a few embodiments of the inventive subject matter have been shown and described, it would be appreciated by those skilled in the art that changes may be made in these embodiments without departing from the principles and spirit of the invention, the scope of which is defined in the claims and their equivalents.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

As used herein, "and/or" means "and" or "or", as well as "and" and "or." Moreover, any and all patent and non-patent literature cited herein is hereby incorporated by references in its entirety for all purposes.

The principles described above in connection with any particular example can be combined with the principles described in connection with any one or more of the other examples. Accordingly, this detailed description shall not be construed in a limiting sense, and following a review of this disclosure, those of ordinary skill in the art will appreciate the wide variety of systems that can be devised using the various concepts described herein. Moreover, those of ordinary skill in the art will appreciate that the exemplary embodiments disclosed herein can be adapted to various configurations without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more".

All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed as "a means plus function" claim under US patent law, unless the element is expressly recited using the phrase "means for" or "step for".

The inventor reserves all rights to the subject matter disclosed herein, including the right to claim all that comes within the scope and spirit of the following claims:

The invention claimed is:
1. A pedal system comprising:
an electromagnet physically associated with a pedal portion and configured to generate a magnetic force when power is supplied thereto;
a switching unit configured to control the power supplied to the electromagnet;
an electronic control unit configured to turn on or off the switching unit;
a sensor electronically coupled to the control unit for providing it a data signal representing a cadence (RPMs) of the pedal portion;
wherein the control unit is configured to control the power to the electromagnet through the switching unit according to predetermined cadence conditions; and
wherein the pedal system further includes a speed sensor and wherein the control unit is configured to control the power to the electromagnet through the switching unit according to predetermined speed conditions of a bicycle or of another pedal-powered vehicle that is physically associated with the pedal system, the power being controlled depending on both (1) a predetermined speed or acceleration threshold, and (2) a predetermined cadence threshold, with power being shut off or reduced if at the predetermined speed or acceleration threshold the cadence is at or below the predetermined cadence threshold.

2. The pedal system of claim 1, wherein the pedal system is configured so that when the sensed speed of the bicycle or other pedal-powered vehicle that is propelled by the pedal system is above a predetermined speed or a predetermined acceleration of the bicycle or other pedal-powered vehicle is sensed, the electronic control unit maintains the power to the electromagnet even if the cadence is below a predetermined threshold or zero.

3. The pedal system of claim 1, further comprising an input unit configured to receive a command from a rider, wherein the electronic control unit controls an operation of the switching unit according to the command input through the input unit.

4. A bicycle or other pedal-powered vehicle including the pedal system according to claim 1.

5. The pedal system of claim 1 wherein the control unit is configured to control the power variably in correspondence with changes in cadence.

6. The pedal system of claim 1 wherein the predetermined speed threshold is 10 mph or less.

7. The pedal system of claim 1 wherein the predetermined speed threshold is 5 mph or less.

8. The pedal system of claim 1 wherein the predetermined cadence threshold is 70 RPM or less.

9. A system for selectively coupling a shoe to a pedal electromagnetically or electromechanically, the system comprising: an electromagnet for coupling the pedal and a shoe and/or an electromechanical retention element for coupling the pedal to a shoe, the electromagnet and/or the electromechanical retention element being activatable based on a signal from a cadence sensor indicating a cadence condition for the pedal associated with the cadence sensor, and from a signal from a speed sensor indicating a speed condition of a bicycle or of another pedal-powered vehicle that is physically associated with the pedal system, the electromagnet being controlled depending on both (1) a predetermined speed or acceleration threshold and (2) a predetermined cadence threshold.

10. The system of claim 9 wherein the electromagnet and/or the electromechanical retention element are physically associated with the pedal.

11. The system of claim 9 further comprising one or more additional sensors for sensing a position or tilt of the bicycle or other pedal-powered vehicle on which the system is physically associated, and the electromechanical retention element being activatable at least in part based on a signal from the one or more additional sensors.

12. The pedal system of claim 9 wherein electromechanical retention element being variably activatable in correspondence with changes in cadence.

13. The pedal system of claim 9 wherein the predetermined cadence threshold is 70 RPM or less.

14. The pedal system of claim 9 wherein the predetermined cadence threshold is 60 RPM or less.

15. The pedal system of claim 9 wherein the predetermined cadence threshold is 50 RPM or less.

16. The pedal system of claim 9 wherein the predetermined cadence threshold is 40 RPM or less.

17. The pedal system of claim 9 wherein the predetermined cadence threshold is 30 RPM or less.

18. The pedal system of claim 9 wherein the predetermined speed threshold is 10 mph or less.

19. A pedal system comprising:
an electromagnet physically associated with a pedal portion and configured to generate a magnetic force when power is supplied thereto;
a switching unit configured to control the power supplied to the electromagnet;
an electronic control unit configured to turn on or off the switching unit;
a sensor electronically coupled to the control unit for providing it a data signal representing a cadence (RPMs) of the pedal portion;
wherein the control unit is configured to control the power to the electromagnet through the switching unit according to predetermined cadence conditions;
wherein the system further includes a speed sensor and wherein the control unit is configured to control the power to the electromagnet through the switching unit according to predetermined speed conditions of a bicycle or of another pedal-powered vehicle that is physically associated with the pedal system, as well as the cadence conditions; and
wherein the system is configured so that when the bicycle or other pedal-powered vehicle is mechanically coupled to the pedal system and a sensed speed is equal to or below 3.5 mph, the electronic control unit decreases or terminates power to the electromagnet at least when the cadence is 50 rpm or higher.

* * * * *